(12) United States Patent
Castiglioni et al.

(10) Patent No.: US 7,634,372 B2
(45) Date of Patent: Dec. 15, 2009

(54) METHOD AND APPARATUS FOR MONITORING CABLE STRANDING

(75) Inventors: Valter Castiglioni, Magenta (IT); Feliciano Cecchi, Inveruno (IT); Francesco Becchi, Genoa (IT)

(73) Assignee: Prysmian Cavi E Sistemi Energia S.R.L., Milan (IT)

(*) Notice: Subject to any disclaimer, the term of this patent is extended or adjusted under 35 U.S.C. 154(b) by 67 days.

(21) Appl. No.: 10/489,197

(22) PCT Filed: Sep. 2, 2002

(86) PCT No.: PCT/EP02/09774
§ 371 (c)(1), (2), (4) Date: Oct. 14, 2004

(87) PCT Pub. No.: WO03/023478
PCT Pub. Date: Mar. 20, 2003

(65) Prior Publication Data
US 2005/0043920 A1 Feb. 24, 2005

Related U.S. Application Data

(60) Provisional application No. 60/323,332, filed on Sep. 20, 2001.

(30) Foreign Application Priority Data
Sep. 11, 2001 (EP) .................... 01203446

(51) Int. Cl.
*G01N 21/00* (2006.01)

(52) U.S. Cl. ............ 702/76; 702/81; 702/183; 356/237.2

(58) Field of Classification Search ............ 702/57, 702/58, 66, 75–77, 81, 158, 159, 182, 183, 702/185, 189; 356/238.2
See application file for complete search history.

(56) References Cited

U.S. PATENT DOCUMENTS

| 4,051,722 | A | | 10/1977 | Feller ........................ 73/160 |
| 4,195,345 | A | * | 3/1980 | Artzt et al. ................. 700/139 |
| 4,358,202 | A | * | 11/1982 | Puffer et al. ............... 356/430 |
| 4,591,995 | A | * | 5/1986 | Schurch ...................... 702/35 |
| 4,735,487 | A | * | 4/1988 | Thorwirth et al. .......... 359/559 |
| 4,887,155 | A | * | 12/1989 | Massen ....................... 348/88 |
| 4,958,083 | A | * | 9/1990 | Sakamoto ............. 250/559.41 |
| 4,979,125 | A | * | 12/1990 | Kwun et al. ................. 702/35 |

(Continued)

FOREIGN PATENT DOCUMENTS

DE 2507651 A1 * 9/1976

(Continued)

*Primary Examiner*—Jeffrey R West
(74) *Attorney, Agent, or Firm*—Finnegan, Henderson, Farabow, Garrett & Dunner, L.L.P.

(57) ABSTRACT

A method and a related apparatus for monitoring an external surface of stranded cables, such as submarine cables for optical telecommunications, and electrical energy cables, provide for telemetrically acquiring a profile of the cable external surface by means of a laser optical triangulation technique, obtaining a spectrum of the telemetrically-acquired profile and comparing the obtained spectrum to a previously measured reference spectrum corresponding to a cable free of defects, thereby deducing the presence of defects by differences in the spectra.

27 Claims, 11 Drawing Sheets

U.S. PATENT DOCUMENTS

| | | | |
|---|---|---|---|
| 5,030,841 A * | 7/1991 | Wampfler | 250/559.22 |
| 5,184,348 A * | 2/1993 | Abdelmouttalib et al. | 370/431 |
| 5,390,544 A * | 2/1995 | Madras | 73/602 |
| 6,512,536 B1 * | 1/2003 | Ross | 348/61 |
| 6,516,210 B1 * | 2/2003 | Foxall | 600/410 |
| 6,778,694 B1 * | 8/2004 | Alexandre | 382/141 |
| 2002/0003426 A1 * | 1/2002 | Mueller et al. | 324/644 |
| 2002/0109831 A1 * | 8/2002 | Van Nguyen et al. | 356/73.1 |

FOREIGN PATENT DOCUMENTS

| | | | |
|---|---|---|---|
| DE | 36 28 654 A1 | | 3/1988 |
| DE | 3628654 A1 | * | 3/1988 |
| DE | 3628654 A1 | * | 3/1988 |
| DE | 198 11 573 C1 | | 6/1999 |
| DE | 19811573 C1 | * | 6/1999 |
| EP | 0 278 431 A2 | | 8/1988 |
| EP | 0 484 536 A1 | | 5/1992 |
| JP | 08233751 A | * | 9/1996 |
| JP | 10260166 A | * | 9/1998 |

* cited by examiner

US 7,634,372 B2

METHOD AND APPARATUS FOR MONITORING CABLE STRANDING

CROSS REFERENCE TO RELATED APPLICATIONS

This application is a national phase application based on PCT/EP02/09774, filed Sep. 2, 2002, the content of which is incorporated herein by reference, and claims the priority of European Patent Application No. 01203446.8, filed Sep. 11, 2001, and claims the benefit of U.S. Provisional Application No. 60/323,332, filed Sep. 20, 2001.

BACKROUND OF THE INVENTION

1. Field of the invention

The present invention relates generally to the field of cable manufacturing. More specifically, the invention relates to a method and a related apparatus for monitoring and, in particular, detecting defects in stranded cables such as for example submarine cables for optical telecommunications or electrical energy cables, either submarine or not.

2. Description of the Related Art

Stranded cables comprises in general a central core and one or more layers of strands helically wound around the core.

Submarine cables for optical telecommunications (in the following also referred to as optical cables, for the sake of conciseness) comprise for example a central optical core in which, within a thin sheath of, e.g., a thermoplastic polymer, a plurality of optical fibers is embedded in a polymer layer formed around a central reinforcing element. Strand-like reinforcing elements made of steel are helicoidally wound around the optical core. The strand-like elements may have different diameters and be arranged to form one or more reinforcing layers.

Optical cables are known having three groups of strand-like reinforcing elements, forming two concentric reinforcing layers. Strand-like elements of the first group, forming the inner reinforcing layer, have a first diameter and are arranged in circumferential succession around the sheath, in mutual contact one to another. Strand-like elements of the second group have a second diameter smaller than the first diameter and are arranged circumferentially around the strand-like elements of the first group. Strand-like elements of the third group have a third diameter smaller than the second diameter and are arranged circumferentially around the strand-like elements of the first group, alternated with the strand-like elements of the second group so as to form, together with the latter, an outer reinforcing layer. The strand-like elements of the third group are arranged in angular positions corresponding to that of the underlying strand-like elements of the first group, so that the outer reinforcing layer has a substantially cylindrical external envelope tangential to the strand-like elements of both the second and third groups.

Thanks to the helicoidal winding of the strand-like elements in each reinforcing layer, the cable maintains a sufficient flexibility, an important feature for the cable laying.

The process of winding strand-like elements around the cable core, or stranding process, is carried out by means of stranding machines, in which bobbins carrying the individual strand-like elements are mounted on a rotating rack or carriage. By rotating the carriage while simultaneously drawing out the cable core, the strand-like elements are wound around the core to form the reinforcing layers.

The stranding process is one of the critical aspects in cable manufacturing. During such a process, defects in the cable negatively affect the quality of the cable or even impart the full functionality thereof.

For example, referring back to the optical cable previously described, possible defects are: the lack of one or more strand-like elements in the inner reinforcing layer; the lack of one or more strand-like elements in the outer reinforcing layer; an erroneous alternation of the strand-like elements in the outer reinforcing layer; the presence of one or more strand-like elements of wrong diameter in the inner and/or outer reinforcing layers; the presence of one or more loose strand-like elements in the inner and/or outer reinforcing layers, and the presence of dislocated strand-like elements, for example one of the strand-like elements of the inner reinforcing layer, which can cause a deformation in the optical core.

The above-mentioned defects may be for example due to the exhaustion of one or more bobbins in the stranding machine or to the breakage of one strand-like element; an inversion in the prescribed order of the bobbins carrying the strand-like elements of different diameter; an erroneous arrangement of bobbins in the stranding machine, for example the arrangement of a bobbin carrying a strand-like element of the inner reinforcing layer in place of a bobbin carrying a strand-like element of the outer reinforcing layer; an incorrect, i.e. too high or too low, back-tension of the strand-like elements.

In order to ensure that the produced cables keep the full functionality and a prescribed level of quality, it is important to monitor the cables just after the stranding process. The importance of detecting the presence of stranding defects just after the stranding process is even higher when further protective, reinforcing and/or insulating layers are to be applied to the stranded cable in subsequent manufacturing steps, which would make a stranding defect extremely difficult to be detected.

U.S. Pat. No. 4,591,995 describes a process and a corresponding device for monitoring single strands in rope or cable in stranding processes, in which the strands involved in the stranding of a rope or cable are investigated for correct sequence, correct surface quality, breakage or run-outs.

According to the teachings provided in that document, the device checks the rope or cable after stranding for uniformity of the rope or cable surface. To this purpose, a transmitter is used for transmitting wave energy of a specified type, for example electromagnetic, optical or acoustic waves, onto the rope or cable. For example, a light source directs a light beam onto the surface of the rope or cable at a point in the course of the stranding process where the rope or cable already has its external form. A sensor receives the amplitude of the reflected part of the wave energy from the rope or cable, for example the light reflected at the single strands. The reflected light is applied as an equivalent electrical signal to a converter-amplifier. During a particular interval of time, for example the time needed for one revolution of the rope or cable in the region of the reflection point, the signal from the converter-amplifier forms a pattern which is compared in a comparator to a reference pattern stored in a memory as an electrical signal. If the difference signal is within a tolerance range, the rope or cable section is assessed as fault-free. If the tolerance limits are exceeded, an alarm signal is triggered which cause the stranding machine shut-off.

In other words, the process and device of U.S. Pat. No. 4,591,995 rely on a measurement of the amplitude, i.e. the intensity of the reflected part of the wave energy from the rope or cable, for example the intensity of the light reflected by the single strands.

The Applicant has found that a method such as the one disclosed in U.S. Pat. No. 4,591,995 relying on the measurement of the intensity of the reflected part of the wave energy from the rope or cable, for example the intensity of the light reflected by the single strands, is affected by some drawbacks.

First of all, the intensity of the reflected light is a parameter which strongly depends on the material and surface characteristics of the single strands. In particular, the intensity of the reflected light depends on the reflectivity of the single strands, as well as on the degree of surface roughness thereof. Differences in the measured values of reflected light intensity with respect to the stored reference pattern could thus arise even if the rope or cable is free of faults, for example because the reflectivity of the single strands is not the ideal or expected one. Even worse, it may happen that a defective cable is for this reason assessed as fault free. Therefore, the intensity of the reflected light does not provide a univocal indication of the presence of faults.

Additionally, the Applicant notices that this document does not provide any teaching on how to discriminate among the different types of defects that may affect the cable.

SUMMARY OF THE INVENTION

The Applicant has found that by analysing a surface profile of a stranded cable acquired telemetrically by means of a laser optical triangulation technique, it is possible to carry on a precise monitoring of the cable and in particular to detect the presence of stranding defects which negatively affect the cable quality or impair the cable full functionality.

The Applicant has also found that a particularly useful method of analysis calls for performing a spectral analysis of the telemetrically-acquired cable surface profile. The Applicant has in fact found that the spectrum of the telemetrically-acquired surface profile of a cable free of defects has a characteristic spectral content, and that the typical defects which may be encountered in a stranded cable induce modifications in such a characteristic spectral content. By comparing the spectrum of the telemetrically-acquired surface profile of a cable under monitoring to the characteristic spectrum of a cable free of defects, it is thus possible to assess the level of quality of the cable and the presence of defects.

According to a first aspect of the invention, there is provided a method for monitoring a cable external surface defined by stranding elements.

The method comprises the steps of telemetrically acquiring a profile of the external surface of the cable by means of a laser optical triangulation technique, and analysing the acquired profile for detecting stranding defects.

In a preferred embodiment, the step of analysing the acquired profile comprises performing a spectral analysis of the acquired profile of the cable external surface.

The step of telemetrically acquiring the profile of the cable external surface preferably includes the steps of obtaining a time-domain signal representative of the telemetrically acquired profile, and eliminating from said time-domain signal noise components not related to the geometry of the cable external surface.

The Applicant has found that the noise components normally appear as slow variations in the time-domain signal; in the frequency domain, the noise components of the time-domain signal correspond therefore to low-frequency components. The step of eliminating noise components may therefore include the step of obtaining a filtered time-domain signal in which the low-frequency components of the time-domain signal are eliminated.

In order to monitor the surface of a cable along the axis thereof, the step of telemetrically acquiring the profile of the cable external surface includes imparting an axial movement to the cable.

In a preferred embodiment, to increase the resolution of the acquired profile, the step of telemetrically acquiring the profile of the external surface of the cable includes imparting a relative rotation of the cable with respect to a telemeter.

The step of performing a spectral analysis may include the steps of:

obtaining a spectrum of the filtered time-domain signal;

comparing the spectrum of the filtered time-domain signal to a reference spectrum, and deducing the presence of stranding defects in the cable by differences in the spectrum of the filtered time-domain signal with respect to the reference spectrum.

In particular, the spectrum of the filtered time-domain signal may be obtained by operating a Fourier transform of the filtered time-domain signal.

Advantageously, the reference spectrum is obtained from a telemetrically-acquired profile of the external surface of a cable free of stranding defects.

In a preferred embodiment, the step of comparing the spectrum of the filtered time-domain signal to the reference spectrum includes:

calculating an integral of the reference spectrum in a prescribed frequency range;

calculating an integral of the spectrum of the filtered time-domain signal in the prescribed frequency range;

comparing the calculated integral of the spectrum of the filtered time-domain signal to the calculated integral of the reference spectrum.

Preferably, said calculating the integral of the reference spectrum and of the spectrum of the filtered time-domain signal includes normalizing the calculated integrals in the prescribed frequency range to obtain values independent from an axial speed of the cable and/or a speed of relative rotation of the cable with respect to the telemeter.

In particular, the step of comparing the integral of the spectrum of the filtered time-domain signal to the integral of the reference spectrum may include:

establishing at least one threshold value based on the calculated integral of the reference spectrum;

assigning a first weight value to a situation in which the calculated integral of the spectrum of the filtered time-domain signal does not exceed the first threshold value;

assigning a second weight value to a situation in which the calculated integral of the spectrum of the filtered time-domain signal exceeds the first threshold value.

Preferably, the method comprises:

establishing a first threshold value and a second threshold value higher than the first threshold value;

assigning a first weight value to a situation in which the calculated integral of the spectrum of the filtered time-domain signal does not exceed the first threshold value;

assigning a second weight value to a situation in which the calculated integral of the spectrum of the filtered time-domain signal exceeds the first threshold value but not the second threshold value;

assigning a third weight value to a situation in which the calculated integral of the spectrum of the filtered time-domain signal exceeds the, second threshold value.

Advantageously, the first, second and third weight values affect a run-time value of a cable quality factor, which provides a measure of a degree of defectiveness of the cable.

The method of the invention may in particular be applied to the, monitoring of submarine cables for optical telecommunications and electrical energy cables.

According to another aspect of the invention, there is provided a process for manufacturing stranded cables, including a phase of applying stranding elements onto a cable core, and a phase of monitoring an external surface of the cable after the phase of stranding. The phase of monitoring includes actuating the method according to the present invention.

According to still another aspect of the invention, there is provided an apparatus for monitoring a cable external surface defined by stranding elements. The apparatus comprises a laser optical triangulation telemeter for telemetrically acquiring a profile of the external surface of the cable, and a processor unit for analysing the acquired profile so as to detect stranding defects.

In a preferred embodiment, the processor unit performs a spectral analysis of the acquired profile of the cable external surface.

Preferably, the telemeter is mounted on a rotatable platform adapted to determine a relative rotation of the telemeter with respect to the cable.

In order to inspect the cable along its length, the cable is made to move axially under the telemeter. To increase the resolution of the acquired profile, the telemeter is preferably made to rotate in a sense opposite to a sense of winding of the stranding elements on the cable.

The apparatus comprises a motor operatively connected to the platform for imparting thereto a rotation movement, and a motor control unit for controlling the motor. Preferably, the control unit controls the motor so that the speed of rotation of the platform varies according to an axial speed of the cable.

In order to increase the apparatus performance, the telemeter is mounted on the platform so that a telemeter laser optical axis is substantially orthogonal to a trajectory of the stranding elements.

According to a further aspect of the invention, there is provided an apparatus for producing stranded cables, particularly submarine optical cables and electrical energy cables, including a stranding machine and, downstream thereof, the monitoring apparatus of the present invention.

BRIEF DESCRIPTION OF THE DRAWINGS

The features and advantages of the present invention will be made clear by the following detailed description of a possible embodiment thereof, provided merely by way of non-limiting example with reference to the annexed drawings, wherein.

DETAILED DESCRIPTION OF THE INVENTION

Figure 1:
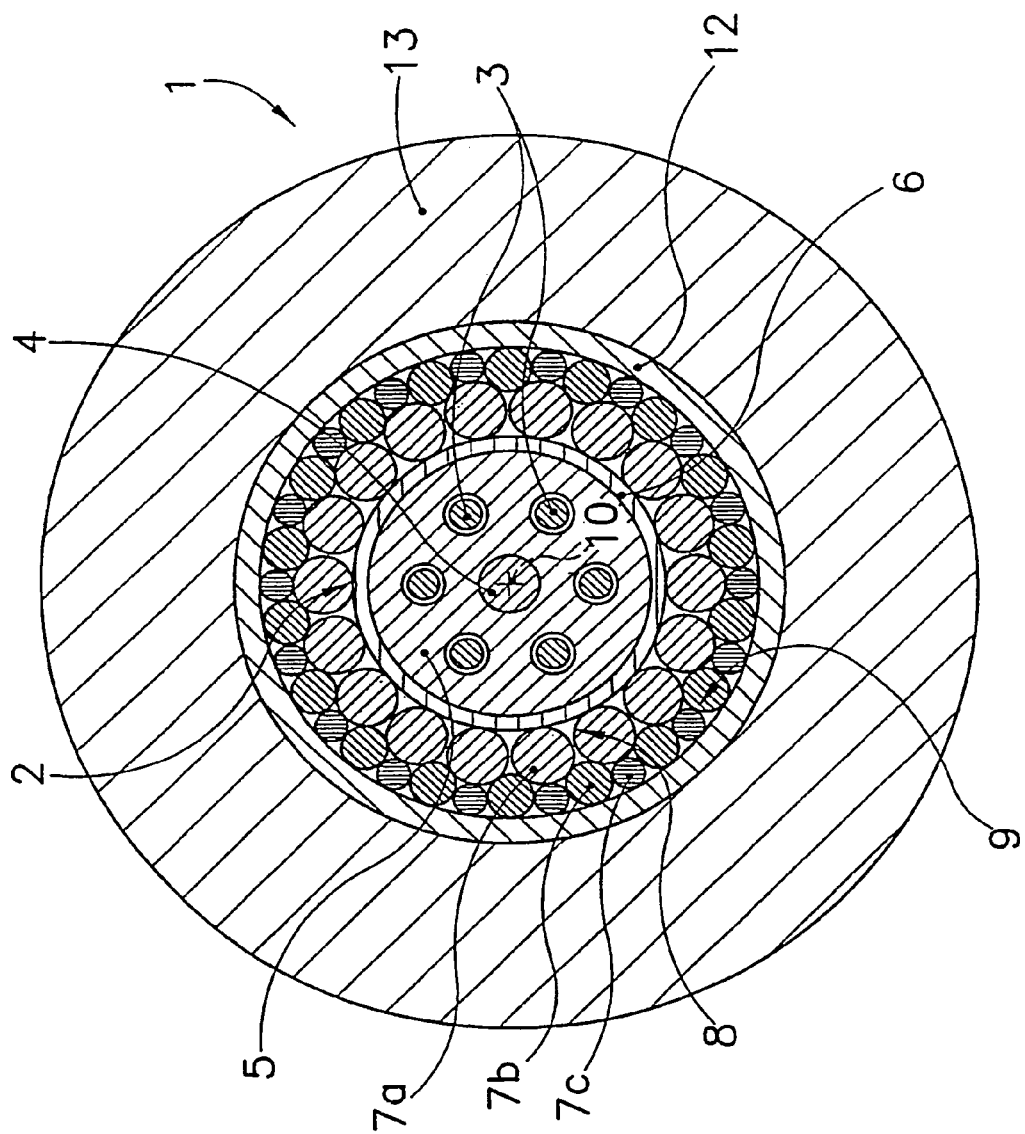
FIG. 1 shows a cross-sectional view of a stranded cable, particularly a submarine cable for optical telecommunication.

With reference to FIG. 1, a stranded cable is shown in cross-sectional view. Specifically, the stranded cable shown in FIG. 1 is a submarine cable for optical telecommunications.

The cable, indicated globally by reference numeral 1, has an axis 10 and comprises a substantially cylindrical central optical core 2. Around the optical core 2 a plurality of protective and reinforcing elements or layers 8, 9, 12 and 13 are provided, which will be described in greater detail later on.

The optical core 2 comprises a central reinforcing element 4, a polymer layer 5 substantially free of discontinuities, a plurality of (six in the shown example) optical fibers 3 embedded in the polymer layer 5 and a thin sheath 6 made for example of a thermoplastic polymer which coats the polymer layer 5. The optical core 2 may for example have an external diameter of 3 to 4 mm.

A plurality of strand-like reinforcing elements 7a, 7b and 7c made of steel is provided around the sheath 6.

More specifically, three groups of strand-like elements are provided. Strand-like elements 7a of the first group have a first diameter, for example 1.4 mm, and are helicoidally wound around the optical core 2. Taking a generic cross-section of the cable 1, the strand-like elements 7a of the first group are arranged in circumferential succession around the sheath 6, in mutual contact one to another so as to provide a self-supporting structure defining a first reinforcing layer 8 outside the sheath 6.

Strand-like elements 7b of the second group have a second diameter smaller than the first diameter, for example 1.2 mm, and are helicoidally wound around the strand-like elements 7a of the first group. Strand-like elements 7c of the third group have a third diameter smaller than the second diameter, for example 0.85 mm, and are also helicoidally wound around the strand-like elements 7a of the first group, alternated with the strand-like elements 7b of the second group. Taking a generic cross-section of the cable 1, the strand-like elements 7b and 7c are arranged, alternated to each other, in circumferential succession around the first reinforcing layer 8 and define a second reinforcing layer 9 outside the first reinforcing layer 8.

The strand-like elements 7c of smallest diameter are preferably arranged in angular positions corresponding to that of the underlying strand-like elements 7a, so that the second reinforcing layer 9 has a substantially cylindrical external envelope tangential to both strand-like elements 7b and 7c.

The assembly consisting of the two reinforcing layers 8 and 9 defines a structure known in the art as a "Warrington" structure.

A tubular lining 12, preferably made of metallic material and more preferably of copper, surrounds the strand-like elements 7b, 7c of the second reinforcing layer 9 and, together with the above-mentioned Warrington structure, defines a reinforcing structure having mechanical characteristics such as to provide the cable 1 with a high resistance to mechanical stresses, in particular to the hydrostatic pressure existing in deep sea zones. Moreover, the lining 12 defines an electrically conductive element which can be used for electrically supplying signal repeaters arranged in the telecommunication system of which the cable 1 forms a part. Finally, the lining 12 allows the inner part of the cable 1 to be protected from moisture and hydrogen.

The cable 1 may further comprise an outer layer 13 of polymer material, preferably polyethylene, which surrounds the lining 12 and provides electrical insulation with respect to the exterior.

Thanks to the fact that the strand-like elements 7a, 7b and 7c are wound helicoidally along the axis 10 of the cable, similarly to a spiral rope, the cable 1 is assured a certain axial flexibility, important for the operation of laying the cable.

The cable manufacturing process provides for first forming the optical core 2 of the cable 1. Then, the two reinforcing layers 8 and 9 are formed by means of a stranding process. A stranding machine is used in which bobbins carrying the individual strand-like elements 7a, 7b and 7c are mounted on a rotating rack or carriage. By rotating the carriage while simultaneously drawing out axially the optical core 2, the strand-like elements 7a are helicoidally wound around the optical core 2 to form the first reinforcing layer 8. Simultaneously, the strand-like elements 7b, 7c are helicoidally wound, in alternated succession, around the first reinforcing layer 8 to form the second reinforcing layer 9. The lining 12 is then applied to the assembly thus obtained and the outer layer 13 is formed around the lining 12, by known techniques.

As previously mentioned, defects in the cable can be produced during the stranding process.

A first possible defect is for example the lack of one or more strand-like elements 7a in the first reinforcing layer 8, or the lack of one or more strand-like elements 7b, 7c in the second reinforcing layer 9. This can be for example due to the exhaustion of one or more bobbins in the stranding machine or to the breakage of a strand-like element.

A second possible defect is for example the erroneous alternation of the strand-like elements 7b and 7c in the second reinforcing layer 9. This can be due for example to an inversion in the prescribed order of the bobbins carrying the strand-like elements 7b and 7c.

A third possible defect is for example the presence, in the first and/or second reinforcing layers 8, 9, of one or more strand-like elements of wrong diameter, for instance the presence of a strand-like element 7a in the second reinforcing layer 9 in place of a strand-like element 7b or 7c. This can be due to an erroneous arrangement of bobbins in the stranding machine.

A fourth possible defect is for example the presence of one or more loose reinforcing elements 7a, 7b or 7c in the first and/or second reinforcing layers 8, 9. This can be due to an incorrect, i.e. too low, back tension of the strand-like element.

A further possible defect is for example the presence of dislocated strand-like elements, which can cause a deformation in the optical core 2. This defect can be caused by a too high back-tension of the strand-like elements.

All the above-mentioned stranding defects determine irregularities in the geometrical arrangement of the strand-like elements depicted in FIG. 1, that is in the geometry of the cable.

Figure 2:
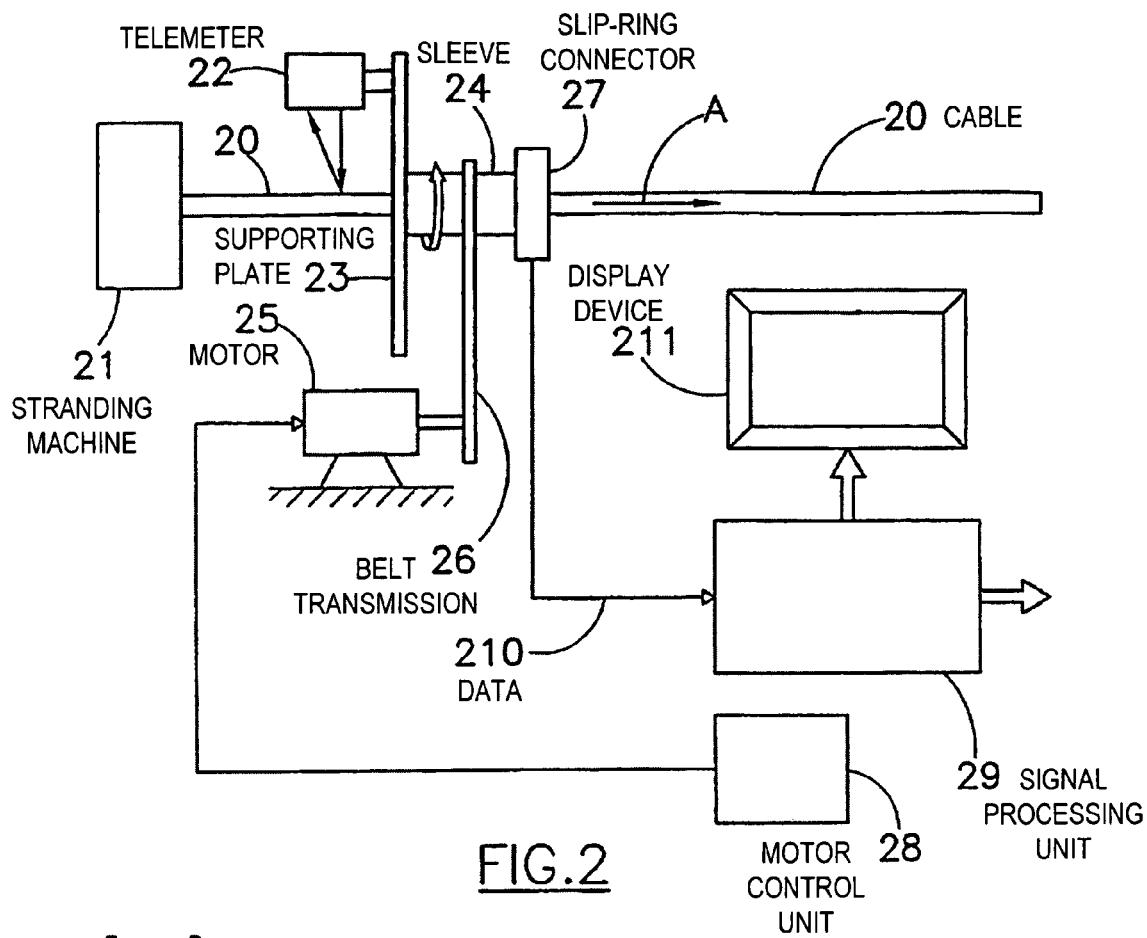
FIG. 2 is a schematic representation of an apparatus for monitoring cables according to, an embodiment of the present invention.

FIG. 2 schematically shows an apparatus for monitoring and detecting the presence of stranding defects according to an embodiment of the present invention. In this figure, reference numeral 20 is used to indicate the cable 1 of FIG. 1 in an intermediate step of the manufacturing process thereof, specifically just after the stranding process. A stranding machine is schematically represented as a block 21 and will not be described in further detail, since it is considered per se known.

The apparatus of the present invention bases its operation on the principle of telemetry, implemented by means of the optical triangulation technique.

In the exemplifying embodiment schematically depicted in FIG. 2, the apparatus comprises a telemeter 22, mounted on a supporting plate 23 which is in turn mounted on a sleeve 24 passed through by the cable 20. The sleeve 24 is rotatable under the action of a motor 25 and a belt transmission 26. A slip ring connector 27 allows the electrical connection to the telemeter 22.

The motor 25 is for example a brushless motor, controlled by a motor control unit 28.

A signal processing unit 29 receives and processes data 210 from the telemeter 22. A display device 211 may be provided for displaying the data received and processed by the signal processing unit 29.

The Applicant has experimentally found that a suitable telemeter 22 is the non-contact laser-optical displacement sensor model ILD 1800-20 produced by MICRO-EPSILON. This sensor has a measuring range of 20 mm, a sampling rate of 5 KHz and a resolution of 2 µm. The spot diameter is approximately equal to 45 µm, and the device may be equipped with a RS 232 serial interface.

Figure 3:
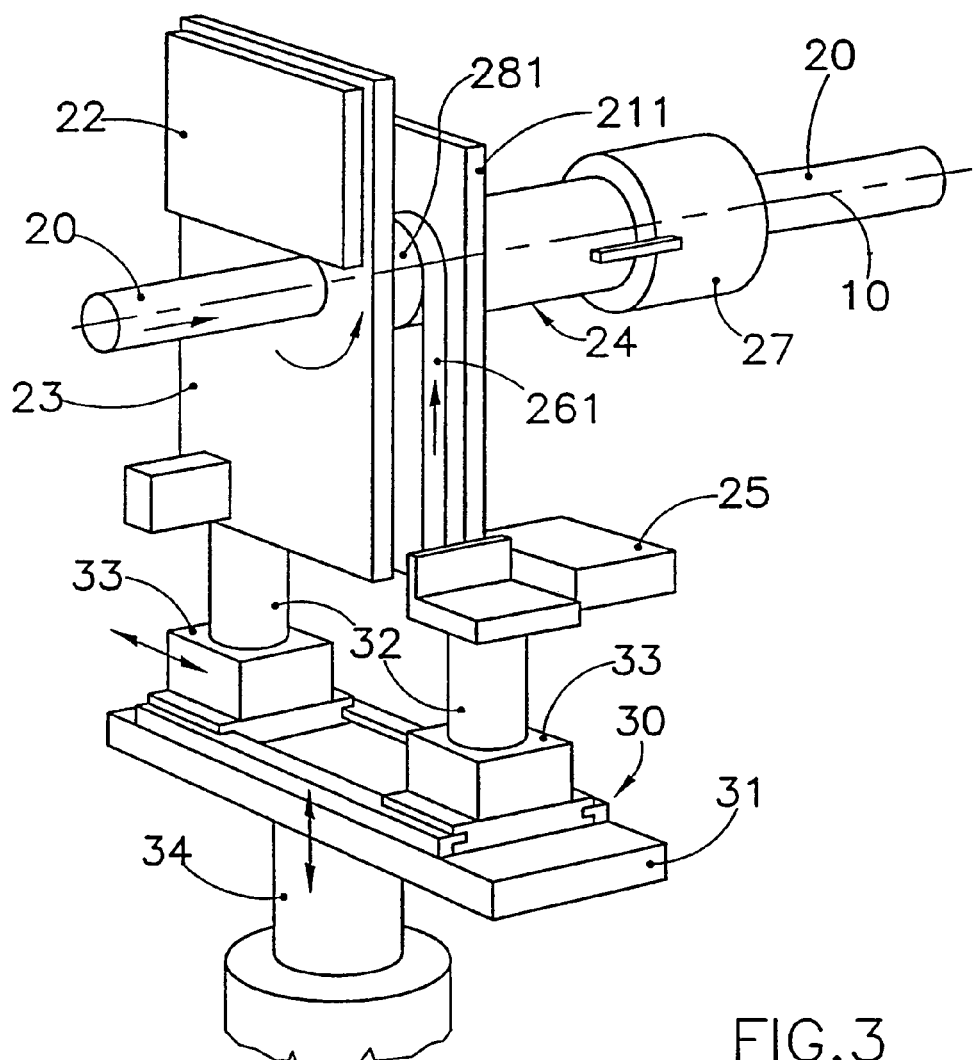
FIG. 3 is a more detailed, axonometrie view of the apparatus shown schematically in FIG. 2.
Figure 4:
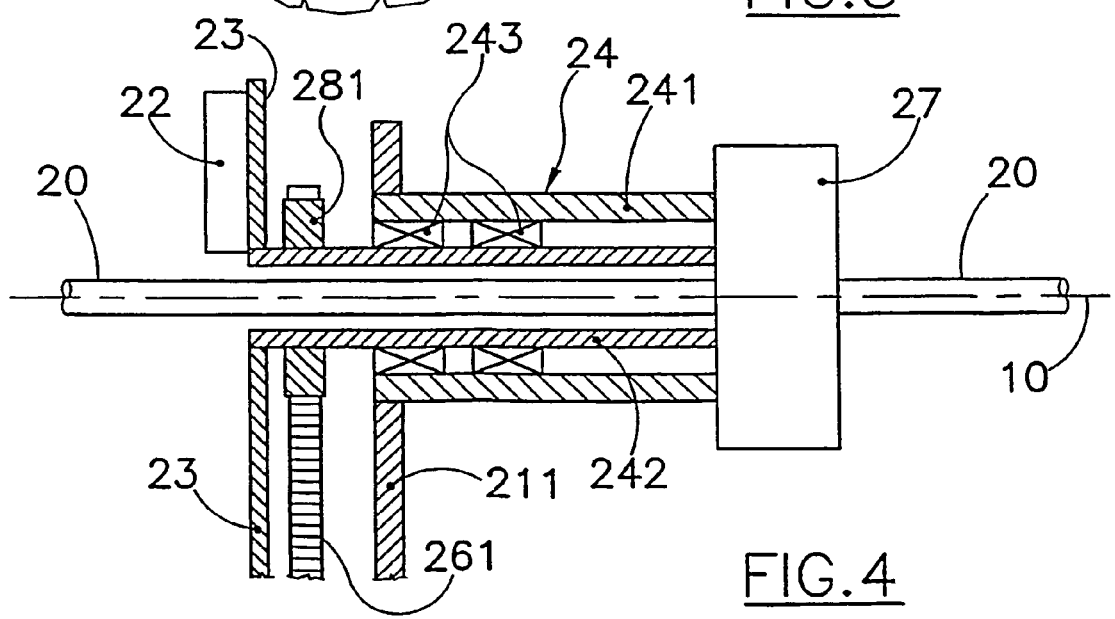
FIG. 4 shows in partial sectional view a detail of the apparatus of FIG. 3.

FIG. 3 is an axonometric view showing in greater detail the apparatus schematically depicted in FIG. 2, and FIG. 4 is an axial sectional view of a detail of FIG. 3. Referring jointly to these two figures, the sleeve 24 comprises a static outer tubular element 241 attached to a static plate 211 and a rotatable inner tubular element 242 coupled to the outer tubular element 241 by means of bearings 243. The rotatable tubular element 242, which protrudes axially outside the static tubular element 241, has mounted thereon a gear wheel 281 receiving a transmission belt 261, which is part, together with gear wheel 281, of the belt transmission 26. The plate 23 carrying the telemeter 22 is attached to the rotatable tubular element 242. The static plate 211 supports the motor 25 and is mounted on a slide 30 provided with a manual actuator (for example a screw actuator) that allows setting the position of the apparatus in a first direction transverse to the cable axis 10, in the specific case the horizontal direction. The static plate 211 is supported on the slide 30 by two cylindrical members 32 slidably coupled to respective boxes 33 fixed to the slide 30. The cylindrical members 32 may be coupled to the boxes 33 by means of a micrometric manual actuator (for example a screw actuator) so as to allow fine adjusting of the position of the static plate 211 in a second direction transverse to the cable axis 10, in the specific case the vertical direction.

The slide 30 is in turn mounted on a platform 31 movable vertically by means of a vertically slidable shaft 34, thus providing an additional device for adjusting the vertical position of the apparatus.

In this way, the apparatus can be centered with respect to the cable axis. Preferably, the centering of the apparatus with respect to the cable axis is periodically checked and, if necessary, trimmed, so as to limit the eccentricity of the telemeter rotation axis with respect to the cable axis, this eccentricity contributing to the low frequency noise that will be discussed later on.

In order to increase the performance of the telemeter, the latter is preferably mounted on the plate 23 in such a way that the laser optical axis has a prescribed inclination with respect to a direction normal to the cable axis, in particular so as to be orthogonal to the helix trajectory.

Preferably, the apparatus elements shown in FIG. 3 will be enclosed in a cabinet, so that the telemeter 22 operates in a dark environment.

The plate 23 and consequently the telemeter 22 is preferably made to rotate around the axis 10 of the cable 20 in a sense opposite to the sense of helicoidal winding of the strand-like elements 7a, 7b, 7c around the optical core 2. Rotation of telemeter 22 makes the laser spot to rotate around the cable axis. Assuming that the speed of rotation of the laser spot around the cable axis is equal to the rotation speed of the stranding machine carriage, each strand-like element passes twice under the laser spot for each turn of the helicoidal winding. A higher speed of rotation of the laser spot allows to increase the number of times that each strand-like element is explored for each turn of the winding, thus increasing the precision of the monitoring. The higher the rotation speed of the laser spot around the cable axis opposite to the sense of strand winding, the higher the density of samples along the cable and the higher the spatial resolution of defects.

However, this is not to be considered limitative to the present invention, since the telemeter 22 may as well be kept steady with respect to the cable axis. In this case, each strand-like element is explored only once per winding turn. After a cable section of length equal to the pitch of the winding has passed under the telemeter, all the strand-like elements are explored.

The telemeter could also be made to rotate in the same sense of the helicoidal winding of the strand-like elements. In this case, in order to explore all the strand-like elements, a section of cable longer than the winding pitch should pass under the telemeter. If however the speed of rotation of the telemeter is such that the telemeter completes a revolution in the time taken by a single winding to pass under the telemeter, only one strand-like element is constantly explored.

The apparatus of the present invention is suitable to implement a method for monitoring an external surface of a cable that allows detecting stranding defects.

In brief, this method comprises telemetrically acquiring the surface profile of the cable to be monitored, calculating the power spectrum of the detected signal, and then comparing this spectrum with a reference spectrum previously acquired, corresponding to a cable free of defects.

The Applicant has in fact observed that the presence of defects determines the appearance of additional spectral components in the power spectrum and, at least for some defects, the distortion of the characteristic spectral components of the cable free of defects. The Applicant has in particular noticed that, typically, the integral of the power spectrum of a cable with defects differs from the integral of the power spectrum of a cable free of defects at least of a factor of ten. By taking the power spectrum calculated for a cable free of defects as a reference power spectrum, and comparing it to the power spectrum calculated for a cable under formation, it is thus possible to ascertain the presence of defects in the cable under formation.

The Applicant has found that an effective way to perform the comparative spectral analysis of the telemetrically-acquired surface profile of a cable free of defects and of a cable under formation is that of carrying out a comparison of the integrals of the respective power spectra.

The method of the present invention will now be described making reference to the simplified flowcharts of FIGS. 5A, 5B and 5C.

Figure 5A:
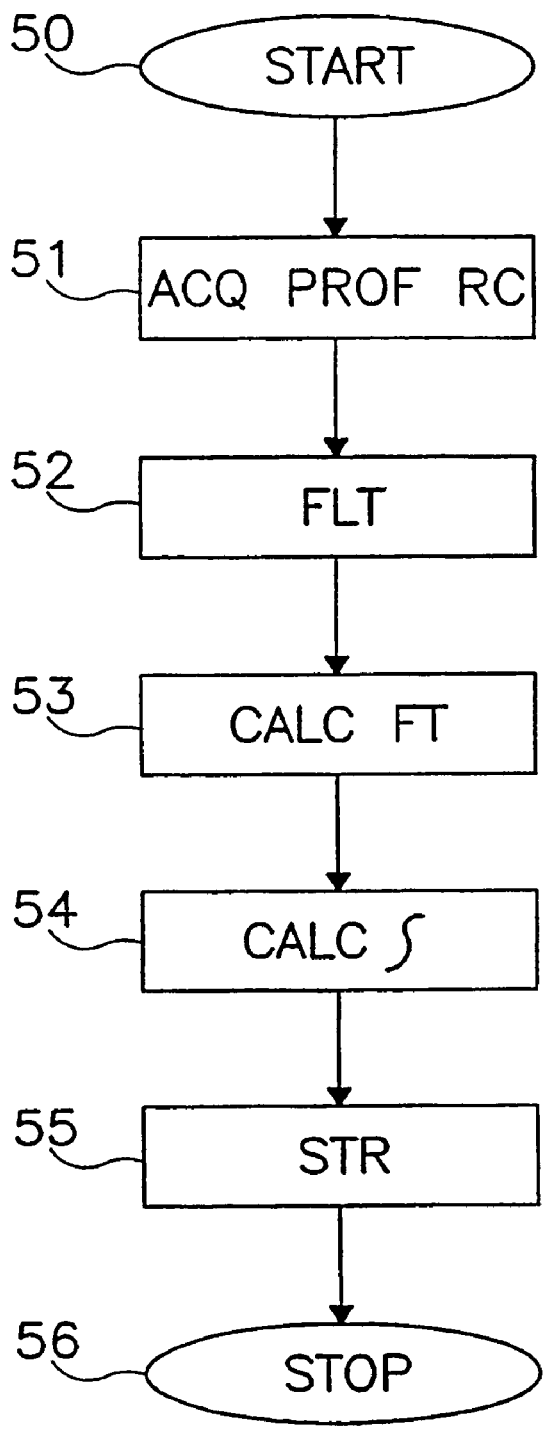
FIGS. 5A, 5B and 5C are simplified flowcharts of an embodiment of the method of the invention.

First, with reference to FIG. 5A, a cable of the same type of the cable to be monitored and which has been assessed as free of defects is taken as a reference cable and is subjected to a monitoring process.

A reference cable monitoring routine is started (block 50, "START"). The external surface profile of the reference cable is telemetrically acquired by the telemeter 22 (block 51, "ACQ PROF RC").

Figure 6:
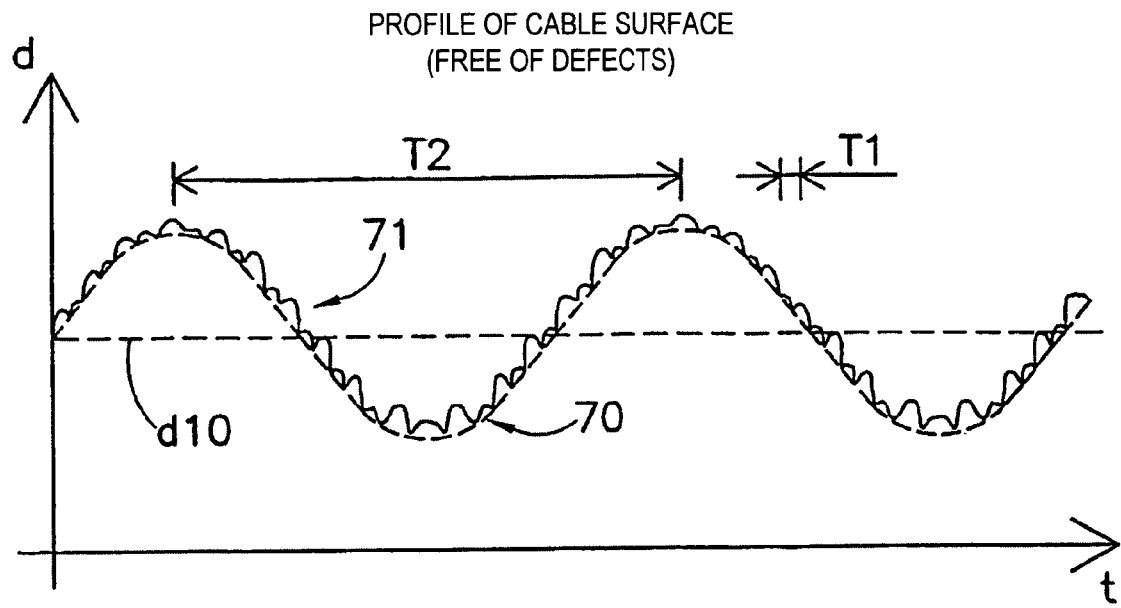
FIG. 6 is a qualitative curve showing the telemetrically acquired profile of the surface of a cable free of defects.

FIG. 6 is a qualitative diagram showing the variation in time t (in ms) of the distance d (in mm) of the surface of a cable 20 free of defects, measured by the telemeter 22 as the cable is drawn out axially, in the direction of arrow A in FIG. 2. For the sake of simplicity, the telemeter 22 has been kept steady with respect to the cable axis. The measured distance d as a function of time shows fast (i.e., high frequency) variations 71 (represented in solid line), having a first periodicity T1, superimposed on slower (i.e., low frequency) variations 70 (represented in broken line) having a second periodicity T2.

The faster variations 71 are due to the passage under the laser spot of the strand-like elements 7b, 7c and represent the useful signal for evaluating the presence of defects in the cable.

The slower variations 70 are due to oscillations of the cable during the movement thereof in the sense of arrow A, as well as to cable ovalities and, in case the telemeter rotates around the cable, to eccentricities of the telemeter rotation axis with respect to the cable axis. The slower variations 70 are not related to the geometry of the cable and are not useful for ascertaining the presence of defects in the cable. The slower variations 70 represent therefore a noise signal component.

A dashed line $d_{10}$ represents the average distance of the detected surface profile from the telemeter.

Figure 7:
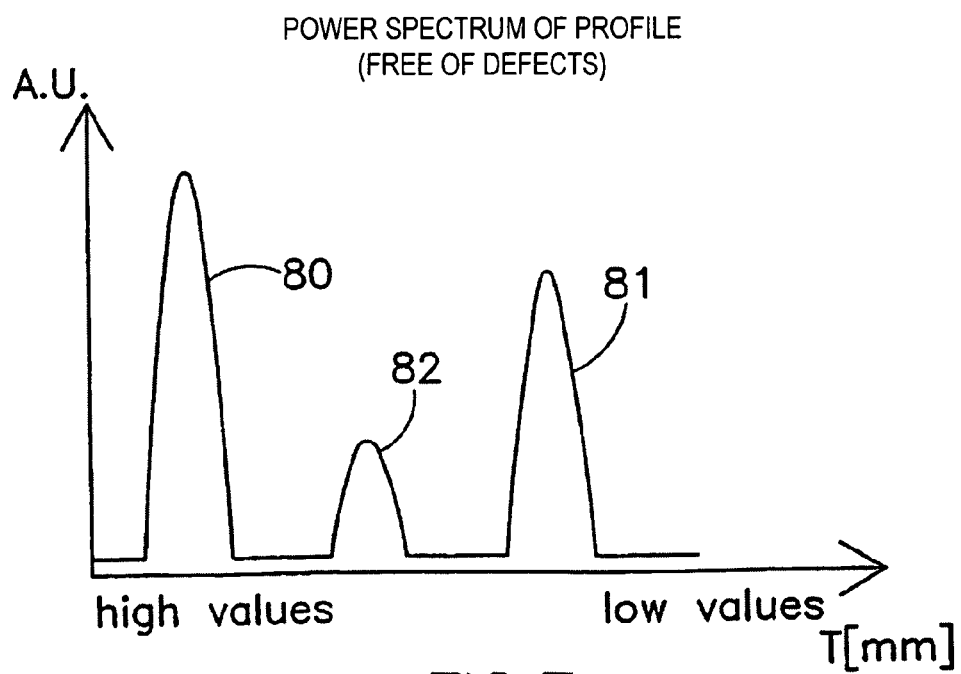
FIG. 7 is a qualitative representation of the power spectrum of the time-dependant signal of FIG. 6.

FIG. 7 is a qualitative diagram showing the power spectrum (in arbitrary units A.U.) of the signal of FIG. 6 as a function of the period T (in mm, in inverse logarithmic scale) of the measured distance variations. The power spectrum has substantially three spectral components 80, 81 and 82. The spectral component 80 at the longest periods, which corresponds to the slow variations represented by the sinusoid 70, defines a low-frequency noise spectral component and is due to oscillations of the cable and/or to ovalities of the cable. In the case the telemeter is made to rotate around the cable, the low-frequency spectral component also includes the noise contribution due to eccentricities of the telemeter rotation axis with respect to the cable axis.

The spectral component 81 at the shortest periods, which defines a first characteristic spectral component or fundamental harmonic, is due to the succession of strand-like elements 7b, 7c. The frequency of the fundamental harmonic depends on the number of strand-like elements which pass under the laser spot in the unit time, and is independent of the diameter of the strand-like elements.

The spectral component 82, which defines a second characteristic spectral component or sub-harmonic, is at approximately twice the period (i.e., half the frequency) of the spectral component 81 and is due to the different diameter of the alternating strand-like elements 7b and 7c. Therefore, this component depends on the number of strand-like elements of a same diameter (i.e. elements 7b or elements 7c) that pass under the laser spot in the unit time.

The characteristic spectral components 81 and 82 (i.e. the fundamental harmonic and the sub-harmonic) depend on the cable geometry, particularly on the pitch of the helicoidal windings, on the speed of the cable in the direction of arrow A and on the speed of rotation of the telemeter around the cable axis.

Differently, the noise spectral component 80 depends on the speed of the cable, as well as on specific steps of the manufacturing process.

The characteristic spectral components 81 and 82 appear to be well separated from the noise spectral component 80. The useful signal, which is composed of a plurality of samples, with a sampling rate corresponding to that of the telemeter (5 KHz in the case of model ILD 1800-20 produced by MICRO-EPSILON), can thus be extracted from the acquired signal by means of a high-pass filtering process suitable to cancel the noise and stabilize the acquired signal (block 52, "FLT" in FIG. 5A). This filtering process is performed in the time domain on the telemetrically acquired signal.

To this aim, an acquisition time window is first defined, by considering a sufficiently high number of samples, and then the high-pass filtering is carried out, preferably by implementing an Infinite Impulse Response ("IIR") filter, for example a cascade filter.

Figure 8:
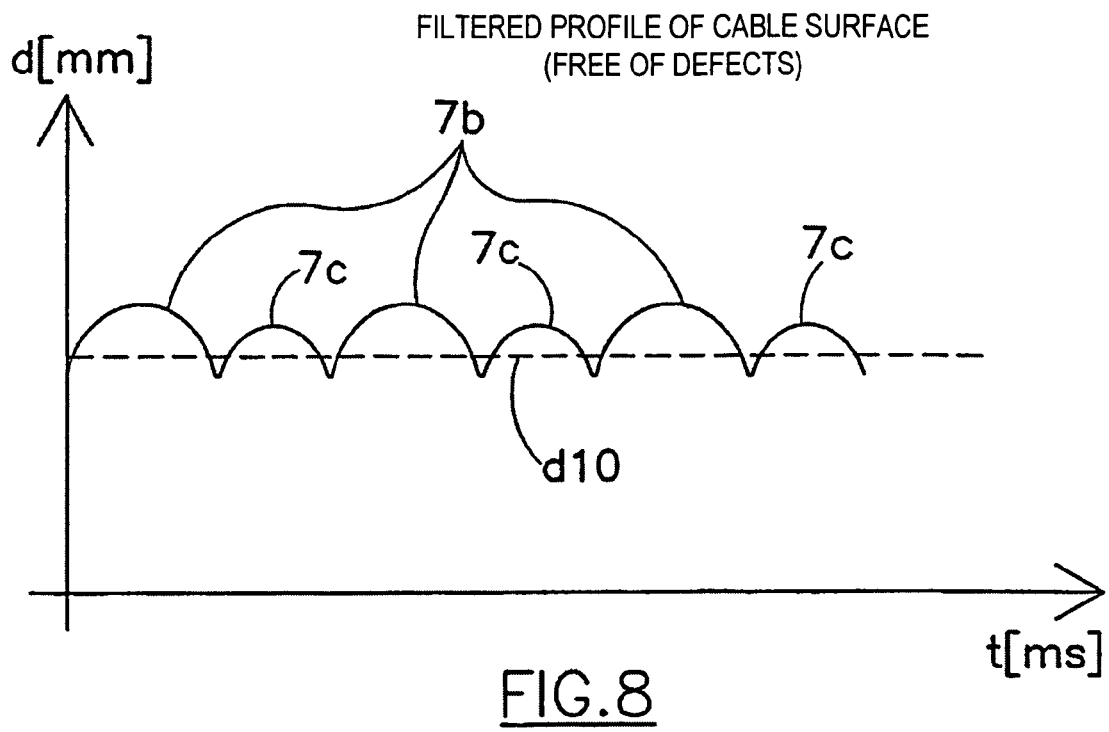
FIG. 8 shows the time-dependant signal of FIG. 6 after a high-pass filtering operation to remove low-frequency noise components.

As a result of the filtering process, a time-domain signal like the one qualitatively depicted in FIG. 8 is obtained. This signal provides the linear development of the external surface profile of the cable 20.

After having eliminated the noise signal components by means of the filtering process, the spectrum of the telemetrically-acquired profile of the reference cable is determined.

Figure 9:
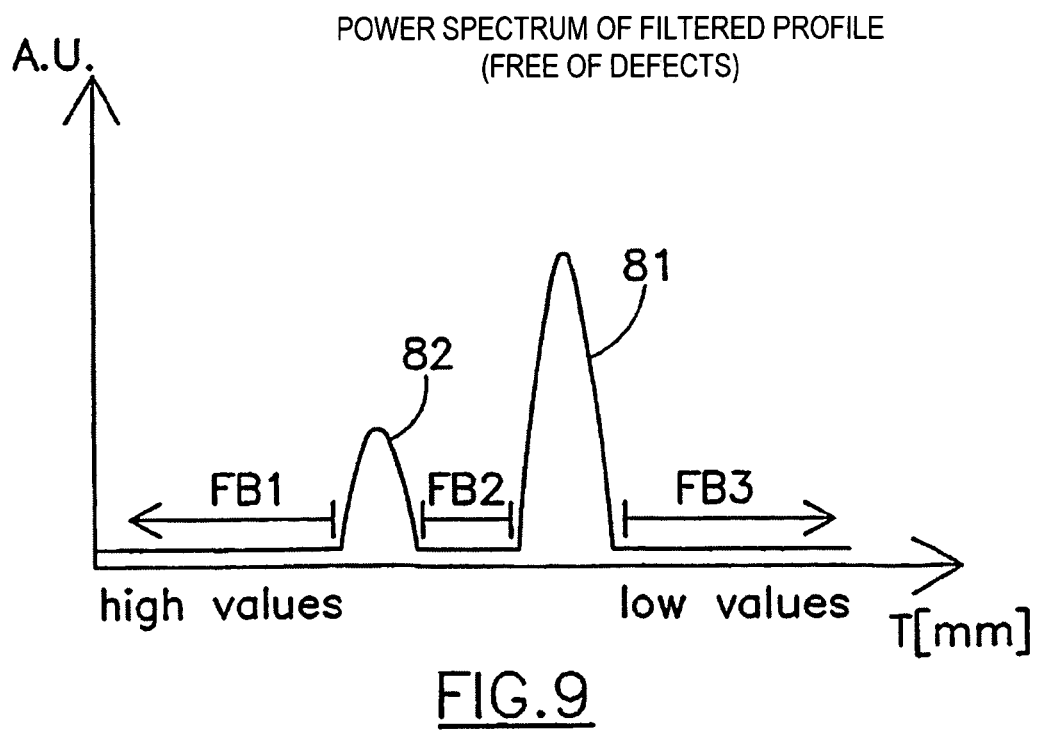
FIG. 9 shows the power spectrum of the time-dependant signal of FIG. 8.

To do this, the samples making up the filtered signal are first weighted by a window function, preferably a Hamming window, so as to remove spurious frequencies. A Fourier transform of the windowed signal is then calculated (block 53, "CALC FT"), and a power spectrum as shown in FIG. 9 is thus obtained, where the noise component 80 has been cancelled.

The integral of the power spectrum for the reference cable is then calculated (block 54, "CALC ∫") and stored in a memory of the signal processing unit 29 (block 55, "STR").

Preferably, in calculating the integral of the power spectrum only a portion of the power spectrum is taken into consideration. Such a portion is preferably a percentage of the frequency range that precedes the peak of the fundamental harmonic 81.

The monitoring routine of the cable free of defects is then stopped (block 56, "STOP").

Figure 5B:
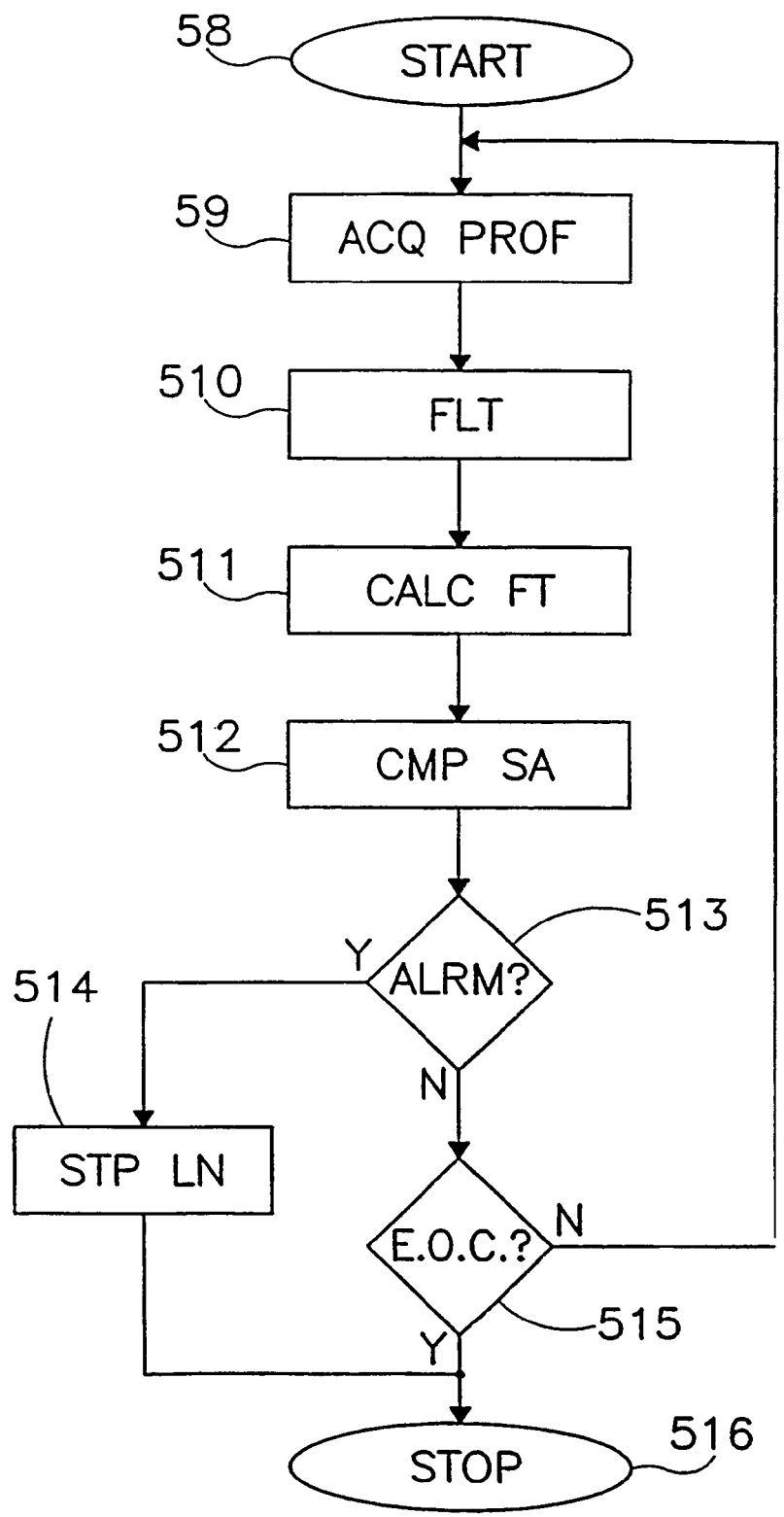

Referring now to FIG. 5B, at the beginning of the stranding process of a cable 20 under formation, a cable monitoring routine is started (block 58, "START"), and the external surface profile of a section of the cable 20 is telemetrically acquired by the telemeter 22 (block 59, "ACQ PROF").

As in the routine of FIG. 5A, the filtering process for cancelling the noise components and stabilizing the acquired signal is performed (block 510, "FLT"). The samples are then weighted by the Hamming window function and the Fourier transform of the filtered signal is calculated (block 511, "CALC FT"), so as to obtain the power spectrum of the detected signal.

The Applicant has verified that, while the power spectrum obtained from a cable free of defects has substantially zero spectral content in the frequency bands FB1, FB2, FB3 shown in FIG. 9 (i.e. the frequency bands separated by the characteristic frequencies 81 and 82), this is not so for defective cables. In particular, the presence of defects induces a non-zero spectral content in the frequency bands FB1 and FB2, and may also modify the spectral content at the two characteristic frequencies. The spectral content in the frequency band FB3 does not instead change significantly.

The cable monitoring routine then provides for performing a comparative spectral analysis of the telemetrically-acquired surface profile of the cable free of defects and of the section of cable under formation (block 512, "CMP SA"). If as a result of this comparative spectral analysis the presence of defects in the cable under formation is ascertained, an alarm can be set (block 513, "ALRM?") which can for example cause the cable production line to be stopped (block 514, "STP LN"). The cable monitoring routine is then stopped (block 516, "STOP").

If differently it is ascertained that the cable is free of defects, the alarm is not set, the cable production line is not arrested and the monitoring routine continues on further cable sections until the end of the cable (block 515, "E.O.C.?").

Figure 5C:
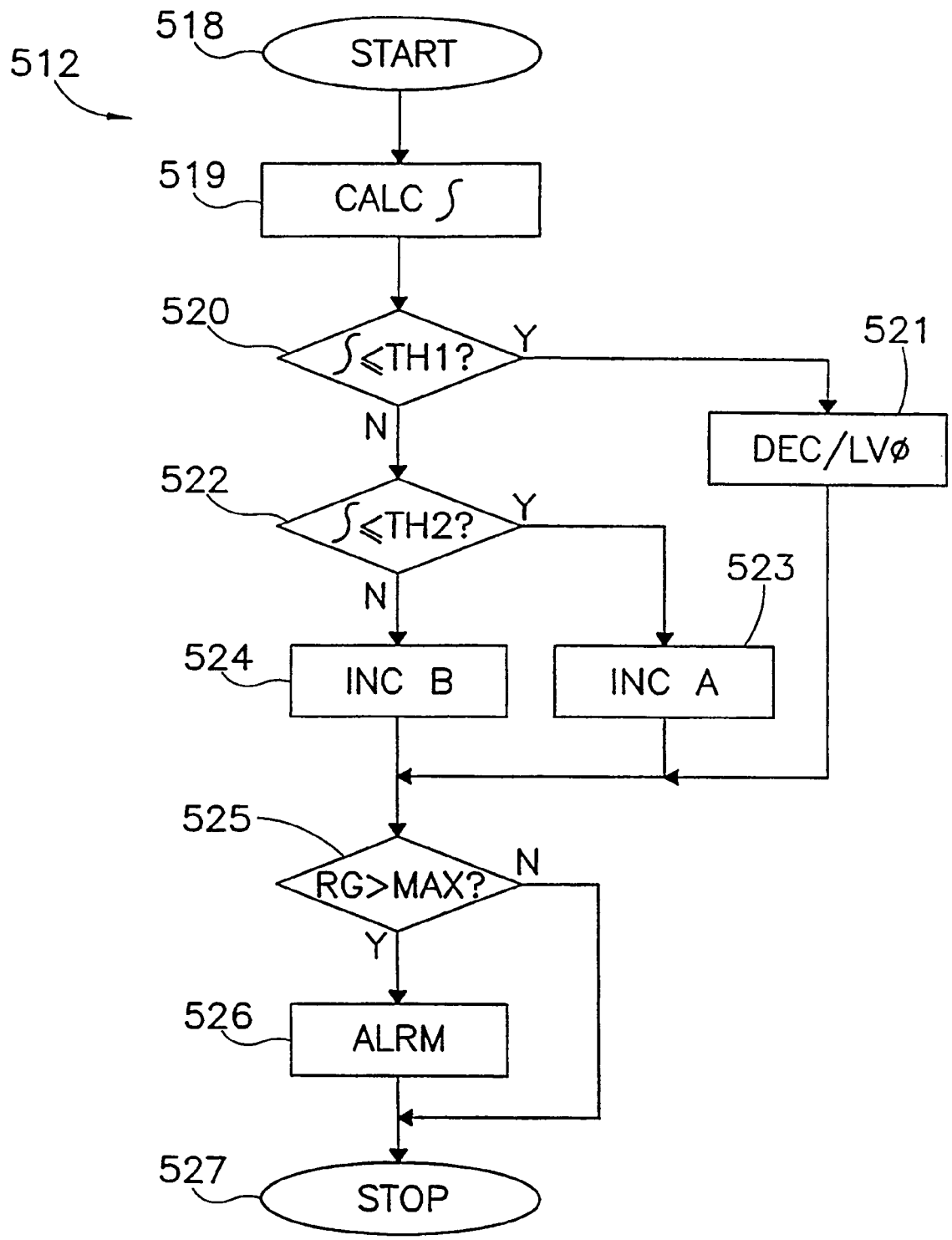

FIG. 5C is a simplified flowchart of a possible embodiment of the comparative spectral analysis of block 512.

Each time the subroutine of block 512 is invoked (block 518, "START") the integral of the power spectrum obtained from the cable under formation is calculated (block 519, "CALC ∫"). Again, only a portion of the power spectrum is preferably taken into consideration, for example the fraction of the frequency range that precedes the peak of the fundamental harmonic 81.

The calculated integral of the power spectrum for the monitored section of cable under formation is then compared to the reference power spectrum integral value stored in the memory of the signal processing unit 29.

It is worth noting that by comparing the value of the integral of the power spectrum for the cable under formation to the stored reference power spectrum integral value, it would even be possible to determine some of the above-mentioned types of defects.

However, it is possible to derive a degree of defectiveness of the cable, based on the substantial difference between the value of the integral of the power spectrum relating to a defective cable and that of a non-defective cable (reference value). In this way, classes of defectiveness can advantageously be defined. For example, two threshold values can be defined: a lower threshold value and a higher threshold value. The lower and higher threshold values may for example differ from each other of a factor two.

The definition of these two threshold values allows to define three different classes of defectiveness, and to assign thereto three different weights.

Additionally, a voting algorithm for the cable under formation is implemented, based on the value of the integral of the power spectrum and on the frequency of repetition of situations belonging to one of the three classes of defectiveness.

A register is defined in the signal processing unit 29. At the beginning of the procedure of monitoring of a cable under formation, such a register is set to zero.

If the value of the integral of the power spectrum obtained from the currently monitored section of the cable under formation is lower than or equal to the lower threshold value (block 520, "∫≦TH1"), the integral of the power spectrum relating to such a cable is considered not to differ significantly from the reference one relating to a cable free of defects, and the currently monitored section of cable under formation is considered good, i.e. within the accepted tolerance. This situation causes the value contained in the register to be decreased by a first predetermined weight value, for example 0.5, unless the value contained in the register is already zero, in which case no decrement takes place (block 521, "DEC/LV 0").

If the value of the integral of the power spectrum obtained from the currently monitored section of the cable under formation is higher than the lower threshold value but lower than or equal to the higher threshold value (block 522, "∫≦TH2"), the section of cable under formation is considered to be defective, albeit the defect is not considered serious. For example, the Applicant has verified that a defect that typically produces this result is the presence of a loose strand-like element. This situation causes the value contained in the register to be increased by a second predetermined weight value, for example 0.5 (block 523, "INCA").

If the value of the integral of the power spectrum obtained from the currently monitored section of the cable under formation is higher than the higher threshold value, the monitored section of cable is considered to have a serious defect. For example, the Applicant has observed that a defect that typically produces this result is the presence of a dislocated strand-like element that has caused a deformation of the optical core. The value contained in the register is increased by a third predetermined weight value, for example 1 (block 524, "INCB").

Preferably, in order to increase the sensitivity of the monitoring process, if both the currently monitored section and the immediately previously monitored section of the cable under formation have a power spectrum integral higher than the lower threshold value, the value contained in the register is increased by the second or third predetermined value, plus a fourth predetermined value, for example equal to 1. In this way, the immediate repetition of a defective condition is given a higher weight than a discontinuous appearance of a defective condition. As an alternative, in place of a same fourth value, two different values could be used depending on whether the lower or the higher threshold value has been exceeded.

When the value contained in the register reaches a prescribed maximum value, for example 5 (block 525, "RG>MAX?"), the alarm is set (block 526, "ALRM"), so that the production line can be stopped to prevent the prosecution of the defective stranding process.

The subroutine of block 512 is then exited (block 527, "STOP").

At the end of the monitoring process of a cable under formation, the value contained in the register of the processing unit 29 provides a measure of the cable degree of quality, and can be used to assign a quality index to the cable.

The voting algorithm described above allows to detect situations such as the reiteration of a serious defect in a short period of time, as well as the periodic or quasi-periodic repetition of less serious defects. In the latter case, the voting algorithm allows to detect the presence of a trend potentially critical for the quality of the cable under formation, allowing to intervene before irreversible defects are originated. On the other hand, the voting algorithm avoids considering spurious alarms caused by errors in the process of acquisition of the cable profile, by ignoring isolated occurrences of high values of the integral of the power spectrum.

It is evident that a different number of threshold values can be used, as well as a different voting algorithm, without for this reason departing from the present invention.

Figure 15:
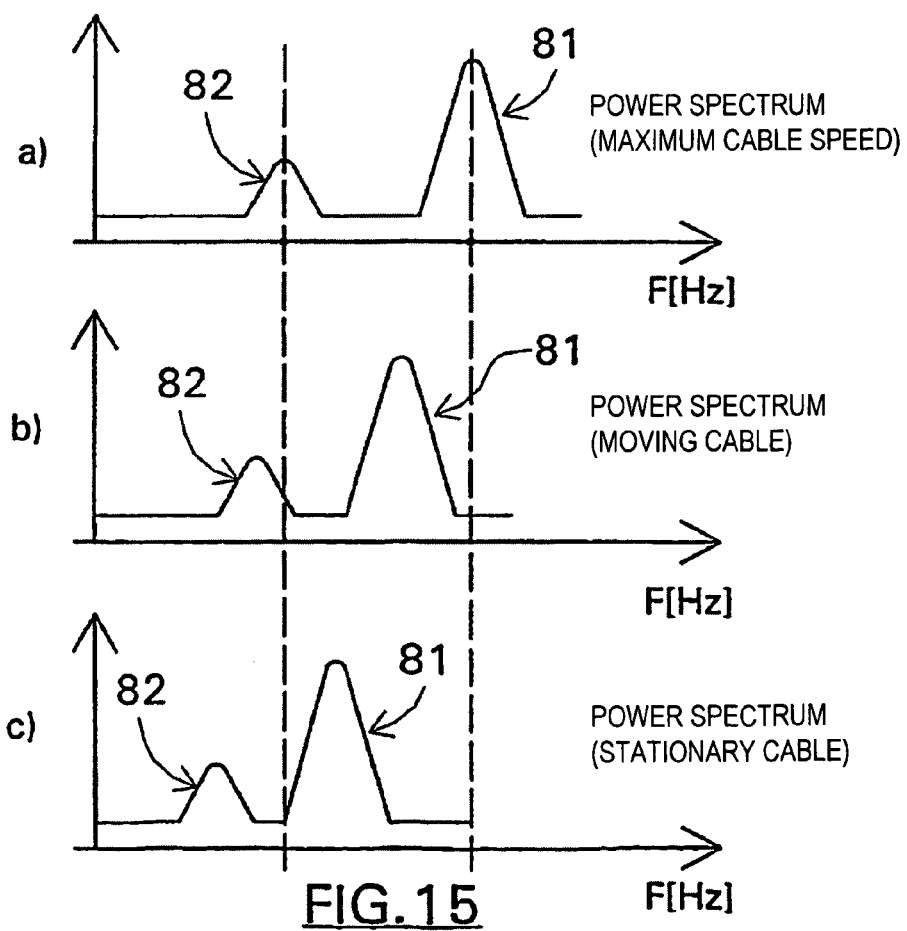
FIG. 15 is a diagram schematically showing changes in the power spectrum of a cable free of defects due to variations of the axial speed of the cable and/or rotational speed of the apparatus of FIGS. 2 and 3.

As previously mentioned, the characteristic spectral components of the telemetrically-acquired profile, that is the fundamental harmonic 81 and the sub-harmonic 82, depend on the cable geometry, particularly on the pitch of the windings, on the speed of the cable in the direction of arrow A and on the rotational speed of the telemeter around the cable axis. For example, the Applicant has found that, as schematically shown in FIG. 15, the power spectrum of the acquired signal dilates or contracts as a function of the cable speed. When the telemeter 22 rotates around the cable axis, the fundamental harmonic 81 is minimum when the cable is steady (diagram c)) and increases as the cable speed increases (diagrams b) and a)), reaching the maximum value in correspondence of the maximum cable speed. The dilation in the signal power spectrum causes the integral of the power spectrum to vary in dependence of the cable speed. The Applicant has observed that the same occurs when the rotation speed of the telemeter is varied.

In order to obtain a value that is not affected by the cable speed and the rotational speed of the telemeter, a normalization operation can be performed by calculating a ratio of the integral of the portion of the power spectrum that precedes the peak of the fundamental harmonic and the peak value of the fundamental harmonic. In this way, a value is obtained which is representative of the presence of cable defects independently of the cable speed, i.e. is both in steady-state condition and during the transients.

Figure 16:
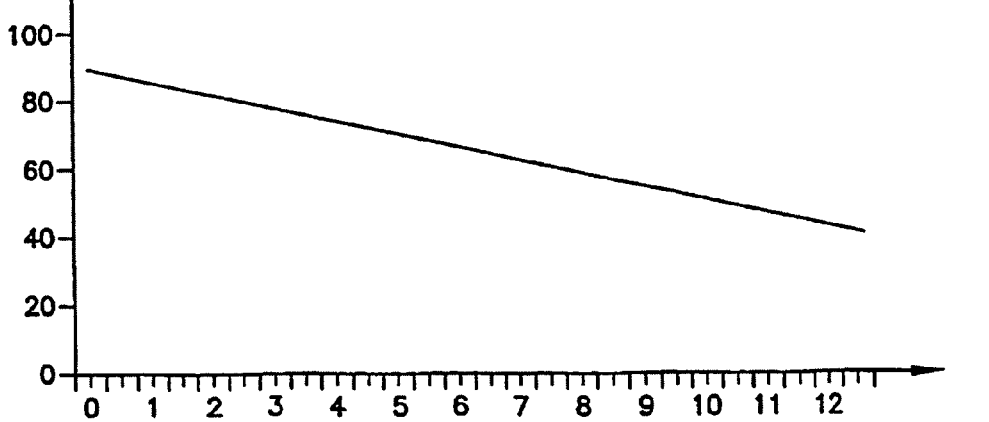
FIG. 16 is a diagram showing a relation between the apparatus rotational speed and the cable axial speed suitable for avoiding the changes in power spectrum shown in FIG. 15.

Alternatively, it is possible to assure that the characteristic spectral components of the signal are always located at same frequencies independently of the cable speed and the rotational speed of the telemeter by making the telemeter rotational speed respect a prescribed relation with the cable speed. The Applicant has found that a suitable relation is that depicted in FIG. 16, that is a substantially linear relation according to which the rotational speed V2 (in RPM) of the telemeter decreases as the cable speed V1 (in m/min) increases.

EXPERIMENTAL MEASURES

According to the method previously described, the Applicant has first monitored a cable free of defects, in the operating conditions reported below.

TABLE I

| | |
|---|---|
| Cable axial speed | 10.5 m/min |
| Stranding machine carriage rotational speed | 47.7 RPM |
| Pitch of the helicoidal winding | 0.22 m |
| Helix angle (angle of the helicoidal winding with respect to the cable axis | 5.31° |
| Helix diameter (diameter of an ideal cylinder passing through the centers of the strand-like elements 7c) | 6.8 mm |
| Telemeter rotational speed | 46 RPM |
| Pitch of the telemeter laser spot on the cable | 0.228 m |
| Telemeter inclination | 5.35° |
| Relative angle | 10.66° |

Figure 10:
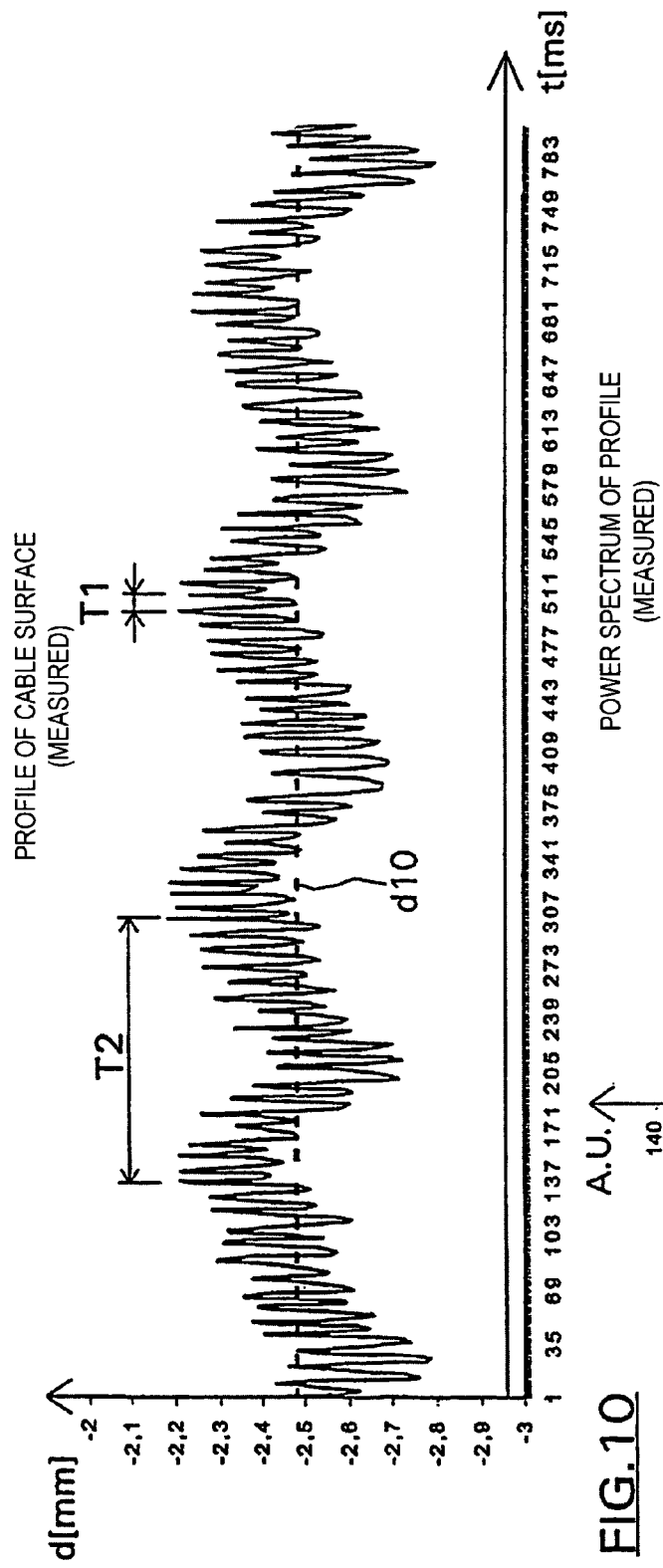
FIG. 10 is the experimentally measured profile of the surface of a cable free of defects.
Figure 11:
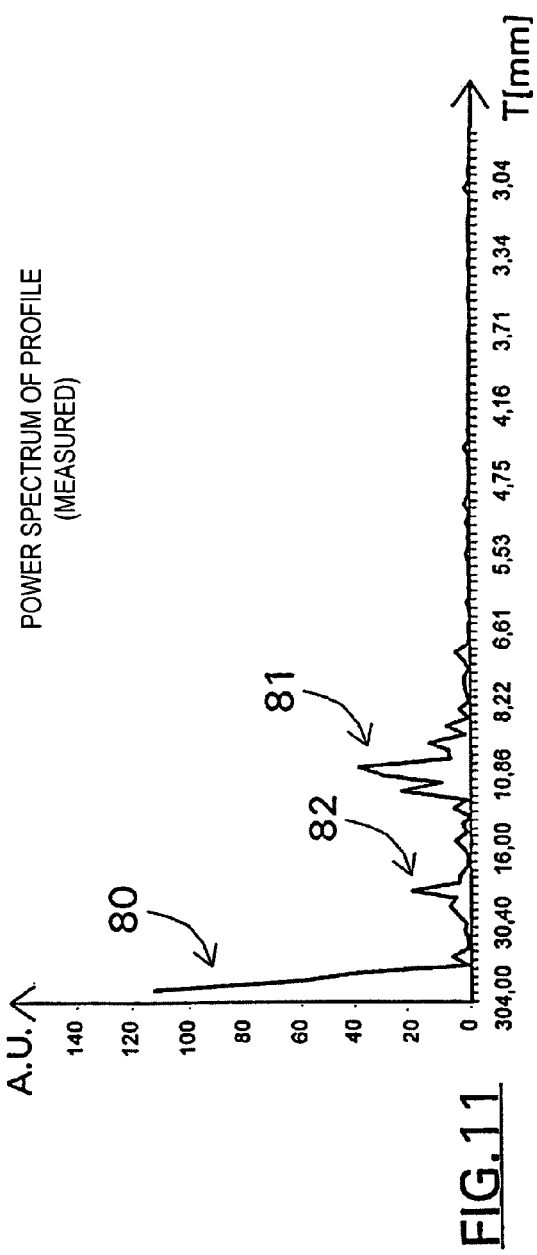
FIG. 11 shows the power spectrum of the signal of FIG. 10.

FIG. 10 and FIG. 11 respectively show the measured time-varying distance d and power spectrum of such a cable.

In FIG. 10, the high frequency variations of period T1 and the low frequency variations of period T2 can easily be distinguished.

In FIG. 11 (which shows the power spectrum as a function of the period T in mm and inverse logarithmic scale), the three spectral components 80, 81 and 82 previously mentioned are visible.

Figure 12:
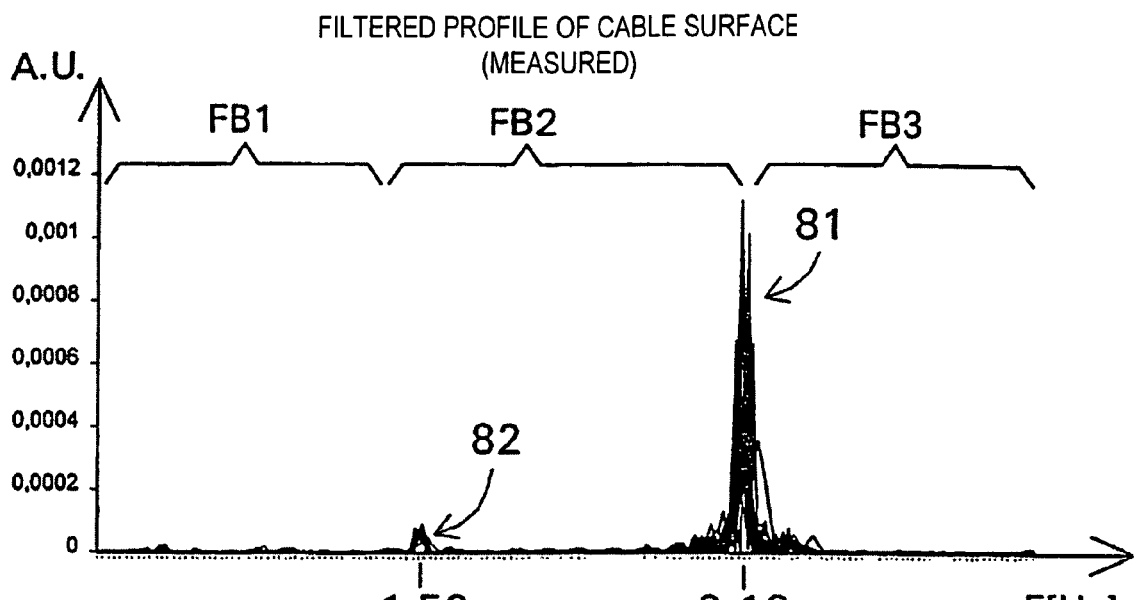
FIG. 12 shows the power spectrum of: the signal of FIG. 10 after a high-pass filtering operation to remove low-frequency noise components.

FIG. 12 shows the power spectrum of the cable free of defects after the filtering and spectrum calculation steps (blocks 52 and 53 in FIG. 5A). The frequencies of spectral components 81 and 82 are 3.12 and 1.56 Hz, respectively.

Figure 13:
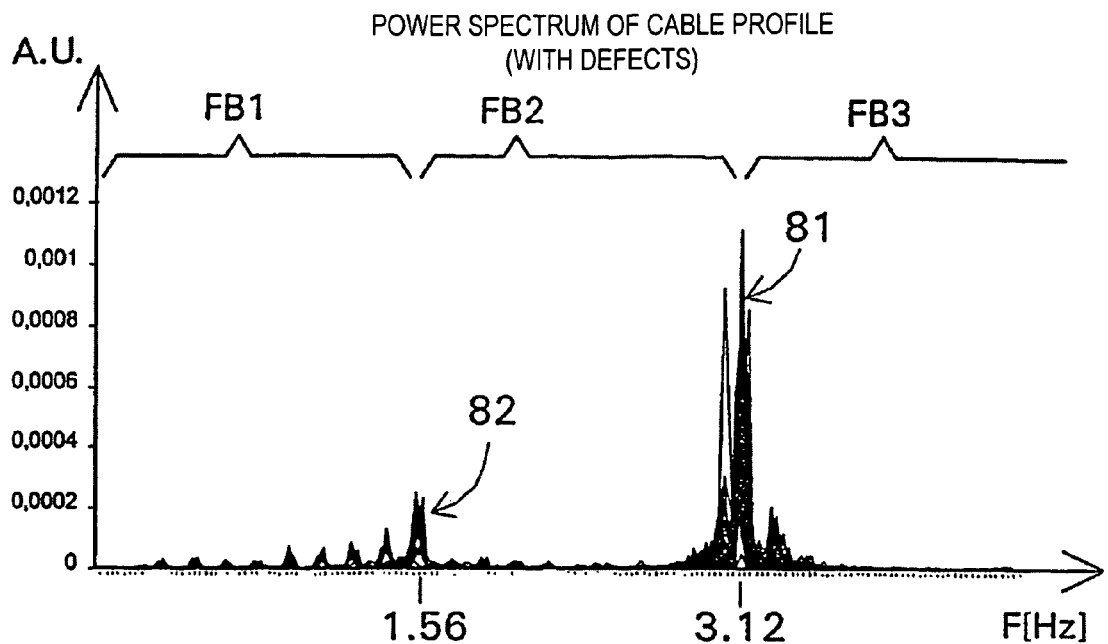
FIGS. 13 and 14 are the power spectra of two cables having different types of defects.
Figure 14:
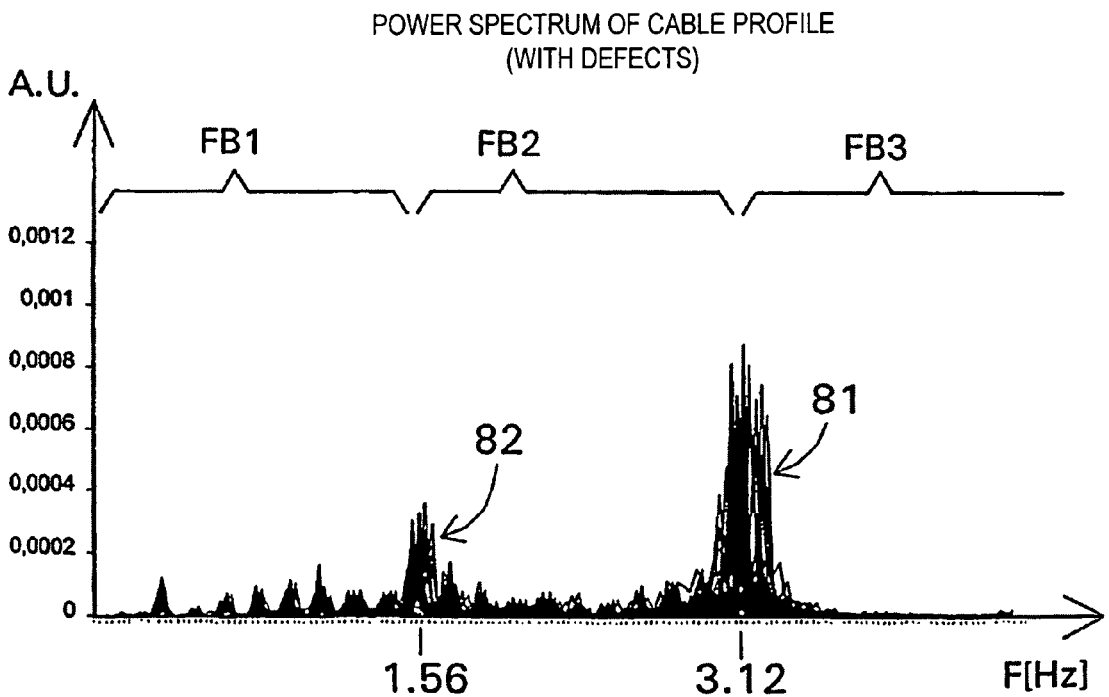

FIGS. 13 and 14 show the power spectra obtained from two cables having defects, monitored in the same operative conditions of Table I. Specifically, FIG. 13 shows the power spectrum obtained from a cable in which a strand-like element 7a, having a diameter of 1.4 mm, has been erroneously wound in place of a strand-like element 7b of diameter 1.2 mm. FIG. 14 shows instead the power spectrum obtained from a cable in which one of the strand-like elements 7c is missing.

It can be observed that the presence of said defects induces a non-zero spectral content in the frequency bands FB1 and FB2, and also modifies the spectral content at the two characteristic frequencies. The spectral content in the frequency band FB3 does not show significant changes.

For each of the said cables with defects, the Applicant has applied the comparison procedure previously described, by calculating the integral of the respective power spectrum and comparing this integral with the integral of the power spectrum of the cable free of defects. Each of the said integrals have been calculated in a portion of the power spectrum corresponding to 78% of the power spectrum delimited by the fundamental harmonic 81, considering frequencies up to the tail-portion of the peak of the fundamental harmonic 81. The contribution of this peak is therefore not included in the integral.

The following table reports the operating conditions and the results of further trials conducted by the Applicant on a cable free of defects, with different cable speed and telemeter rotational speed compared to those reported in Table I.

TABLE II

| | |
|---|---|
| Cable axial speed | 2 m/min |
| Stranding machine carriage rotational speed | 8.7 RPM |
| Pitch of the helicoidal winding | 0.22 m |
| Helix angle (angle of the helicoidal winding with respect to the cable axis | 5.31° |
| Helix diameter (diameter of an ideal cylinder passing through the centers of the strand-like elements 7c) | 6.8 mm |
| Telemeter rotational speed | 80 RPM |
| Pitch of the telemeter laser spot on the cable | 0.025 m |
| Telemeter angle | 40.71° |
| Relative angle | 45.82° |

The Applicant has found that, in these conditions, the frequencies of spectral components 81 and 82 are 2.96 and 1.48 Hz, respectively.

Referring back to Table I, the cable speed has changed from 10.5 m/min to 2 m/min, and the telemeter rotational speed has been increased from 46 RPM to 80 RPM, as suggested by the relation of FIG. 14. It can be seen that by varying the telemeter rotational speed according to the relation depicted in FIG. 16, the frequencies of the two characteristic spectral components do not vary significantly.

It is pointed out that the comparative spectral analysis of the telemetrically-acquired surface profile of a cable free of defects and of a cable under formation can be conducted in alternative ways, for example by comparing the power spectra in each of the three frequency bands FB1, FB2 and FB3. This can for example be done by calculating and then comparing the integrals of the power spectra in each of these frequency bands.

Albeit the comparative spectral analysis of the telemetrically-acquired surface profile of a cable free of defects and of a cable under formation is an effective way of ascertaining the presence of stranding defects, it could be replaced by a direct analysis of the telemetrically-acquired surface profiles. For example, thresholds for the telemetrically measured distances could be set, and the presence of defects be deduced by the trespassing of the thresholds.

The present invention therefore provides a method and an apparatus that can be advantageously used to monitor stranded cables and, in particular, detect surface defects in stranded cables, such as submarine cables for optical telecommunications or electrical energy cables.

Although the present invention has been disclosed and described by way of an embodiment, it is apparent to those skilled in the art that several modifications to the described embodiment, as well as other embodiments of the present invention are possible without departing from the scope thereof as defined in the appended claims.

What is claimed is:

1. A method for monitoring an external surface of a cable, said external surface being defined by stranding elements, the method comprising:
   telemetrically acquiring a profile of the external surface of the cable by means of a laser optical triangulation technique;
   obtaining a time-domain signal representative of the telemetrically acquired profile of the external surface of the cable;
   performing a spectral analysis of the time-domain signal representative of the acquired profile of the external surface of the cable to obtain a frequency spectrum having at least one characteristic spectral component each corresponding to harmonics due to cable geometry, the at least one characteristic spectral component dividing the frequency spectrum into a plurality of frequency bands, frequencies in the plurality of frequency bands not corresponding to the at least one characteristic spectral component;
   detecting whether the cable comprises any of multiple types of stranding defects based on spectral content in at least one of the plurality of frequency bands; and
   providing, in response to detecting at least one stranding defect among the multiple types of stranding defects, an indication of the at least one detected stranding defect.

2. The method of claim 1, wherein telemetrically acquiring the profile of the external surface of the cable includes:
   eliminating from said time-domain signal noise components not related to a geometry of the external surface of the cable.

3. The method of claim 2, wherein eliminating noise components includes obtaining a filtered time-domain signal in which low-frequency components of the time-domain signal are eliminated.

4. The method of claim 3, wherein performing a spectral analysis includes:
   obtaining a spectrum of the filtered time-domain signal;
   comparing the spectrum of the filtered time-domain signal to a reference spectrum; and
   deducing a presence of stranding defects in the cable by differences in the spectrum of the filtered time-domain signal with respect to the reference spectrum.

5. The method of claim 4, wherein obtaining the spectrum of the filtered time-domain signal includes operating a Fourier transform of the filtered time-domain signal.

6. The method of claim 5, wherein said reference spectrum is obtained from a telemetrically-acquired profile of the external surface a cable free of stranding defects.

7. The method of claim 5, wherein comparing the spectrum of the filtered time-domain signal to the reference spectrum includes:
   calculating an integral of the reference spectrum in a prescribed frequency range;

calculating an integral of the spectrum of the filtered time-domain signal in the prescribed frequency range; and comparing the calculated integral of the spectrum of the filtered time-domain signal to the calculated integral of the reference spectrum.

8. The method of claim 7, wherein calculating the integral of the reference spectrum and of the spectrum of the filtered time-domain signal includes normalizing the calculated integrals in the prescribed frequency range to obtain values independent from an axial speed of the cable and/or a speed of relative rotation of the cable with respect to the telemeter.

9. The method of claim 8, wherein comparing the integral of the spectrum of the filtered time-domain signal to the integral of the reference spectrum includes:

establishing at least one threshold value based on the calculated integral of the reference spectrum;

assigning a first weight value to a situation in which the calculated integral of the spectrum of the filtered time-domain signal does not exceed the at least one threshold value; and assigning a second weight value to a situation in which the calculated integral of the spectrum of the filtered time-domain signal exceeds the at least one threshold value.

10. The method of claim 9, comprising:

establishing a first threshold value and a second threshold value, the second threshold value being greater than the first threshold value;

assigning a first weight value to a situation in which the calculated integral of the spectrum of the filtered time-domain signal does not exceed the first threshold value;

assigning a second weight value to a situation in which the calculated integral of the spectrum of the filtered time-domain signal exceeds the first threshold value but not the second threshold value; and assigning a third weight value to a situation in which the calculated integral of the spectrum of the filtered time-domain signal exceeds the second threshold value.

11. The method of claim 10, wherein said first, second, and third weight values affect a run-time value of a cable quality factor, the cable quality factor provides a measure of a degree of defectiveness of the cable.

12. The method of claim 2, wherein telemetrically acquiring the profile of the external surface of the cable includes imparting an axial movement to the cable.

13. The method of claim 12, wherein telemetrically acquiring the profile of the external surface of the cable further includes imparting a relative rotation of the cable with respect to a telemeter in a sense opposite to a sense of winding of the stranding elements.

14. The method of claim 1, wherein the cable is a submarine cable for optical telecommunications or an electrical energy cable.

15. A process for manufacturing stranded cables, the process including a step of applying stranding elements onto a cable core, and a step of monitoring an external surface of the cable after the step of stranding, the step of monitoring comprising:

telemetrically acquiring a profile of the external surface of the cable by means of a laser optical triangulation technique;

obtaining a time-domain signal representative of the telemetrically acquired profile of the external surface of the cable;

performing a spectral analysis of the time-domain signal representative of the acquired profile of the external surface of the cable to obtain a frequency spectrum having at least one characteristic spectral component each corresponding to harmonics due to cable geometry, the at least one characteristic spectral component dividing the frequency spectrum into a plurality of frequency bands, frequencies in the plurality of frequency bands not corresponding to the at least one characteristic spectral component;

detecting whether the cable comprises any of multiple types of stranding defects based on spectral content in at least one of the plurality of frequency bands; and providing, in response to detecting at least one stranding defect among the multiple types of stranding defects, an indication of the at least one detected stranding defect.

16. An apparatus for monitoring an external surface of a cable, said external surface being defined by stranding elements, the apparatus comprising:

a laser optical triangulation telemeter for telemetrically acquiring a profile of the external surface of the cable and obtaining a time-domain signal representative of the telemetrically acquired profile, and a processor unit configured to:

perform a spectral analysis of the time-domain signal representative of the acquired profile of the external surface of the cable to obtain a frequency spectrum having at least one characteristic spectral component each corresponding to harmonics due to cable geometry, the at least one characteristic spectral component dividing the frequency spectrum into a plurality of frequency bands, frequencies in the plurality of frequency bands not corresponding to the at least one characteristic spectral component, detect whether the cable comprises any of multiple types of stranding defects based on spectral content in at least one of the plurality of frequency bands, and provide, in response to detecting at least one stranding defect among the multiple types of stranding defects, an indication of the at least one detected stranding defect.

17. The apparatus of claim 16, wherein said telemeter is mounted on a rotatable platform adapted to determine a relative rotation of the telemeter with respect to the cable.

18. The apparatus of claim 17, wherein the cable is made to move axially under the telemeter, and the telemeter is made to rotate in a sense opposite to a sense of winding of the stranding elements on the cable.

19. The apparatus of claim 18, comprising a motor operatively connected to the rotatable platform for impeding thereto a rotation movement, and a motor control unit for controlling the motor so that a speed of rotation of the rotatable platform varies according to an axial speed of the cable.

20. The apparatus of claim 19, wherein the telemeter is mounted on the rotatable platform so that a telemeter laser optical axis is substantially orthogonal to a trajectory of the stranding elements.

21. An apparatus for producing at least one of submarine optical cables and electrical energy cables, the apparatus including a stranding machine and, downstream thereof, a monitoring apparatus for monitoring an external surface of a cable, said external surface being defined by stranding elements, the monitoring apparatus comprising:

a laser optical triangulation telemeter for telemetrically acquiring a profile of the external surface of the cable and obtaining a time-domain signal representative of the telemetrically acquired profile, and a processor unit configured to:

perform a spectral analysis of the time-domain signal representative of the acquired profile of the external surface of the cable to obtain a frequency spectrum having at least one characteristic spectral component each corresponding to harmonics due to cable geometry, the at least one characteristic spectral component dividing the frequency spectrum into a plurality of frequency bands, frequencies in the plurality of frequency bands not corresponding to the at least one characteristic spectral component, detect whether the cable comprises any of multiple types of stranding defects based on spectral content in at least one of the plurality of frequency bands, and provide, in response to detecting at least one stranding defect among the multiple types of stranding defects, an indication of the at least one detected stranding defect.

22. The apparatus of claim 21, wherein said telemeter is mounted on a rotatable platform adapted to determine a relative rotation of the telemeter with respect to the cable.

23. The apparatus of the claim 22, wherein the cable is made to move axially under the telemeter, and the telemeter is made to rotate in a sense opposite to a sense of winding of the stranding elements on the cable.

24. The apparatus of the claim 23, comprising a motor operatively connected to the rotatable platform for imparting thereto a rotation movement, and a motor control unit for controlling the motor so that a speed of rotation of the rotatable platform varies according to an axial speed of the cable.

25. The apparatus of claim 24, wherein the telemeter is mounted on the rotatable platform so that a telemeter laser optical axis is substantially orthogonal to a trajectory of the stranding elements.

26. A system configured to monitor an external surface of a cable, the external surface being defined by stranding elements, the system comprising:

means for acquiring a profile of the external surface of the cable;

means for obtaining a time-domain signal representative of the acquired profile of the external surface of the cable;

means for performing a spectral analysis of the time-domain signal representative of the acquired profile of the external surface of the cable to obtain a frequency spectrum having at least one characteristic spectral component each corresponding to harmonics due to cable geometry, the at least one characteristic spectral component dividing the frequency spectrum into a plurality of frequency bands, frequencies in the plurality of frequency bands not corresponding to the at least one characteristic spectral component;

means for detecting whether the cable comprises any of multiple types of stranding defects based on spectral content in at least one of the plurality of frequency bands; and means for providing, in response to detecting at least one stranding defect among the multiple types of stranding defects, an indication of the at least one detected stranding defect.

27. A method for monitoring an external surface of a cable, the external surface being defined by stranding elements, the method comprising:

acquiring, via a telemeter, a profile of the external surface of the cable;

obtaining, via the telemeter, a time-domain signal representative of the acquired profile of the external surface of the cable;

performing, via a processor;

a spectral analysis of the time-domain signal representative of the acquired profile of the external surface of the cable to obtain a frequency spectrum having at least one characteristic spectral component each corresponding to harmonics due to cable geometry, the at least one characteristic spectral component dividing the frequency spectrum into a plurality of frequency bands, frequencies in the plurality of frequency bands not corresponding to the at least one characteristic spectral component;

detecting whether the cable comprises any of multiple types of stranding defects based on spectral content in at least one of the plurality of frequency bands; and providing, in response to detecting at least one stranding defect among the multiple types of stranding defects, an indication of the at least one detected stranding defect.

* * * * *

UNITED STATES PATENT AND TRADEMARK OFFICE
CERTIFICATE OF CORRECTION

PATENT NO. : 7,634,372 B2 Page 1 of 1
APPLICATION NO. : 10/489197
DATED : December 15, 2009
INVENTOR(S) : Castiglioni et al.

It is certified that error appears in the above-identified patent and that said Letters Patent is hereby corrected as shown below:

Title page, item (30),

"Foreign Application Priority Data
Sep. 11, 2001 (EP) .............................01203446"

should read

--Foreign Application Priority Data
Sep. 11, 2001 (EP) .............................01203446.8--.

Signed and Sealed this

Seventh Day of December, 2010

David J. Kappos
*Director of the United States Patent and Trademark Office*